United States Patent [19]

Raya

[11] 4,405,170
[45] Sep. 20, 1983

[54] DEMOUNTABLE CARRIER RACK ASSEMBLY FOR PICKUP TRUCK

[76] Inventor: Ruben N. Raya, 964 West Brook, Santa Ana, Calif. 92703

[21] Appl. No.: 289,305

[22] Filed: Aug. 3, 1981

[51] Int. Cl.³ ............................................. B60P 3/42
[52] U.S. Cl. ........................................ 296/10; 296/3; 296/105; 224/273; 224/309
[58] Field of Search ............. 296/3, 4, 10, 105; 224/309, 315, 321, 273

[56] References Cited

U.S. PATENT DOCUMENTS

| | | | |
|---|---|---|---|
| 2,129,893 | 9/1938 | Walden | 296/105 |
| 2,670,988 | 3/1954 | Cook | 296/105 |
| 2,824,764 | 2/1958 | Stirling | 296/105 |
| 2,886,372 | 5/1959 | Weidner | 296/3 |
| 2,947,566 | 8/1960 | Tower | 296/10 |
| 3,155,419 | 11/1964 | Garson et al. | 296/10 |
| 3,201,171 | 8/1965 | Wickard | 296/105 |
| 3,424,487 | 1/1969 | Pector et al. | 296/3 |
| 3,765,713 | 10/1973 | Suitt | 296/3 |
| 3,874,721 | 4/1975 | Tuffle | 296/105 |
| 3,901,548 | 8/1975 | Seaman, Jr. | 296/10 |
| 3,955,845 | 5/1976 | Werner | 296/10 |
| 4,141,581 | 2/1979 | Tobin | 296/10 |

*Primary Examiner*—Richard A. Bertsch
*Attorney, Agent, or Firm*—Edward E. Roberts

[57] ABSTRACT

A demountable carrier rack for a pickup truck, the rack including a primary structural framework for securing to the front sides of the truck bed. A removeable secondary framework is provided for securing to the tail end of the truck bed with the two frameworks being interconnected by a pair of longitudinally extending running bars and a transversly extending adjustable load bar. The primary frame work and the inside of the truck bed are provided with collecting devices for storing the secondary framework, the running bars and the adjustable load bar.

16 Claims, 14 Drawing Figures

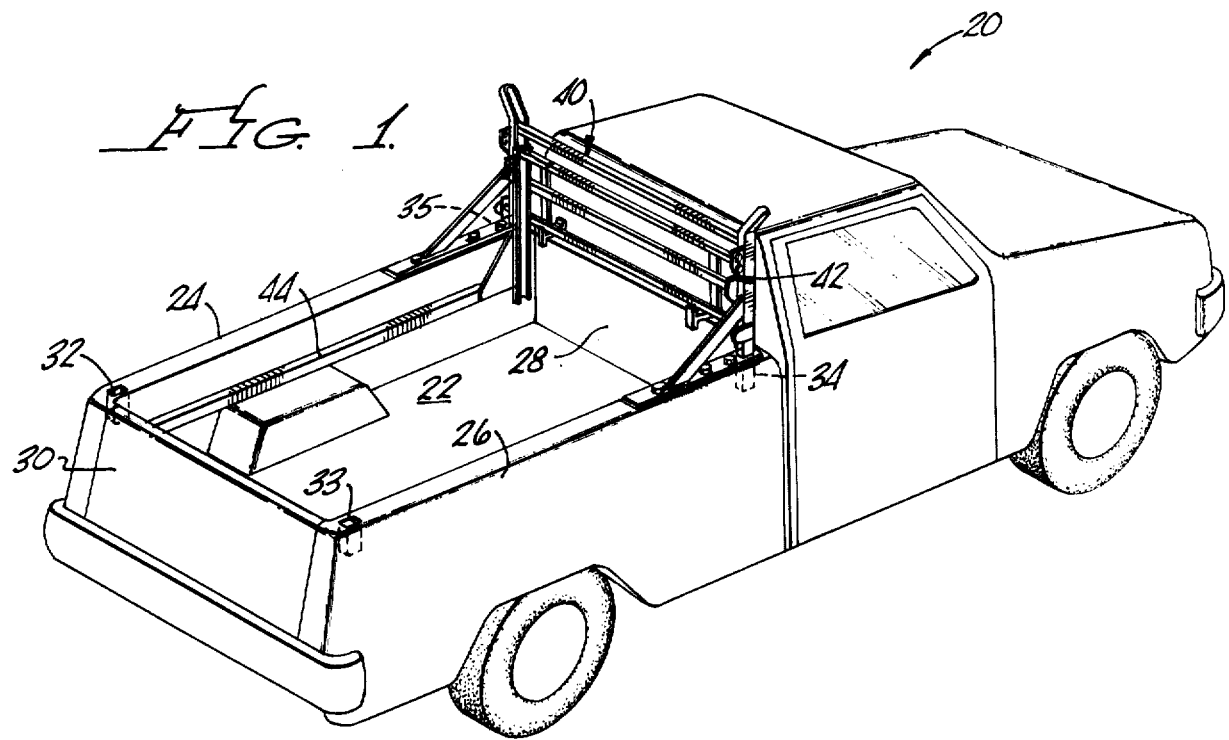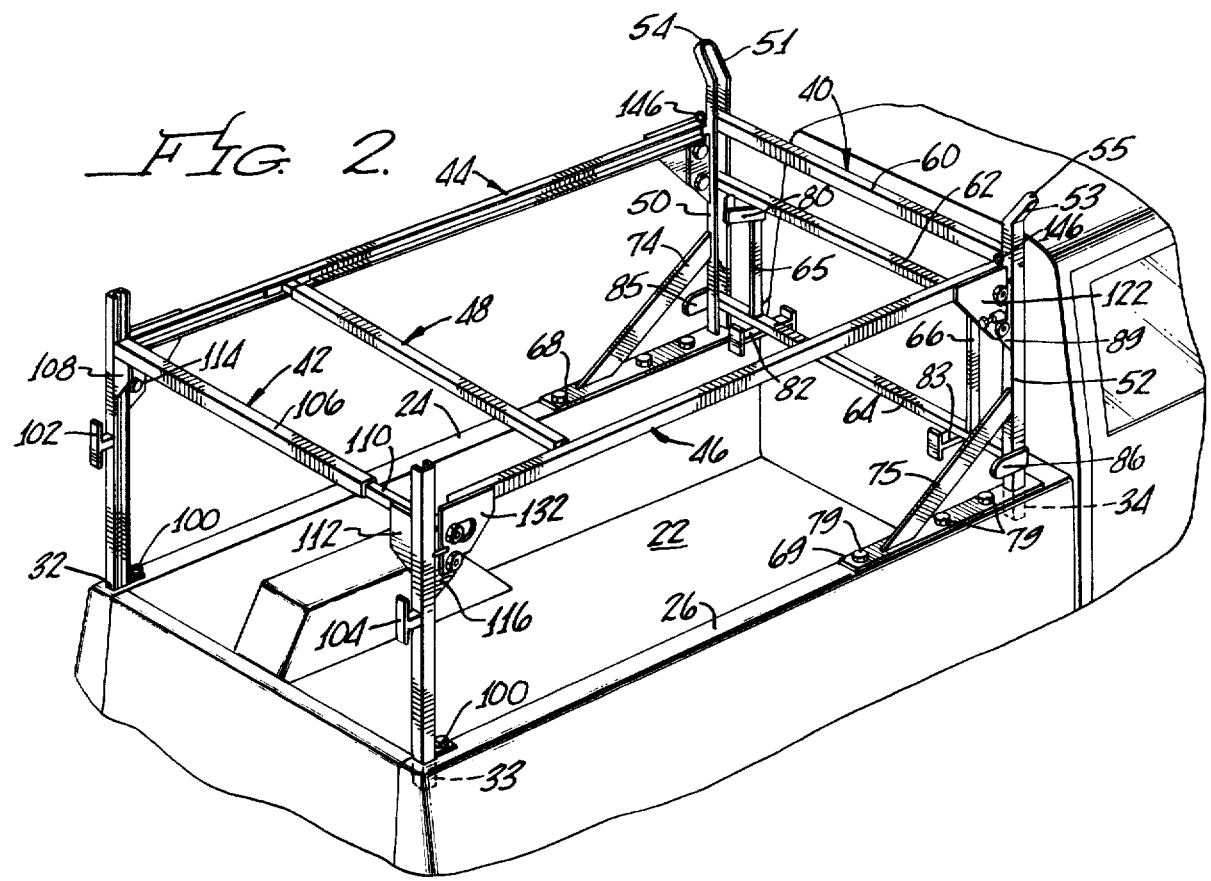

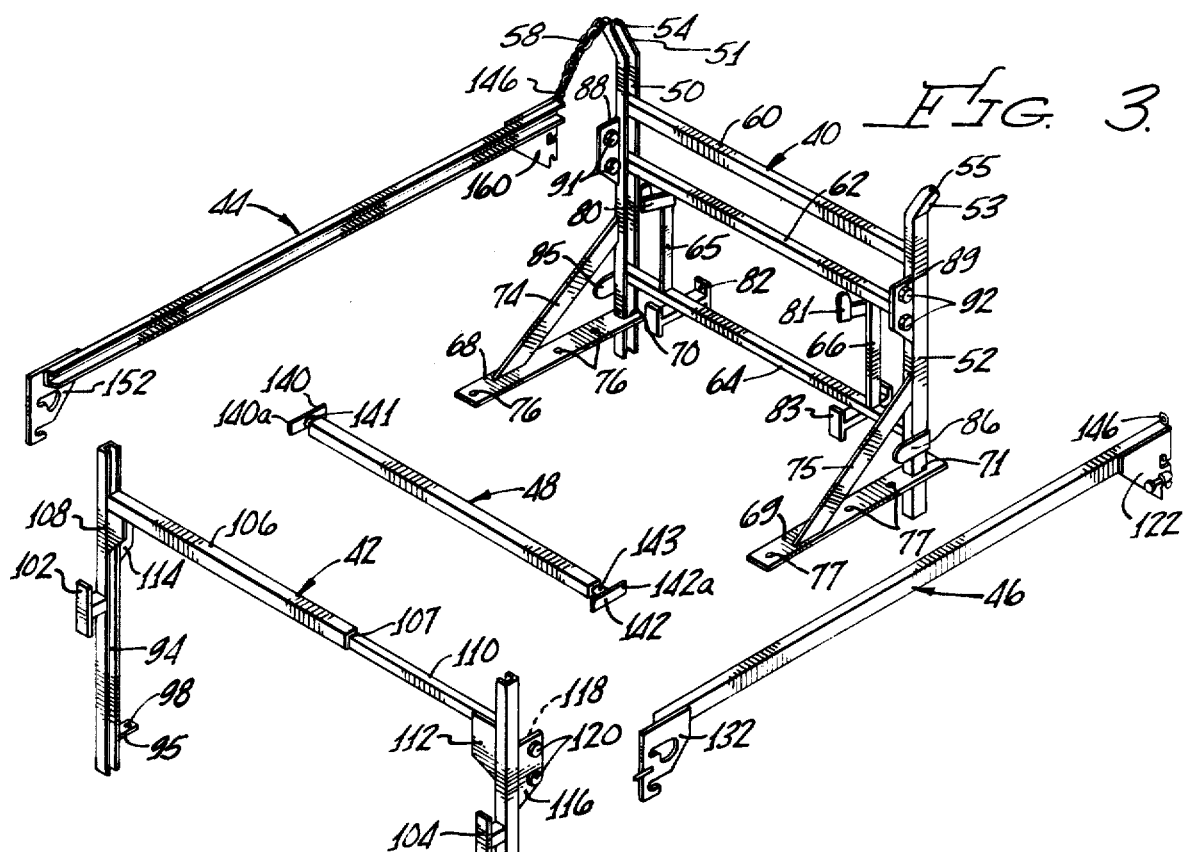
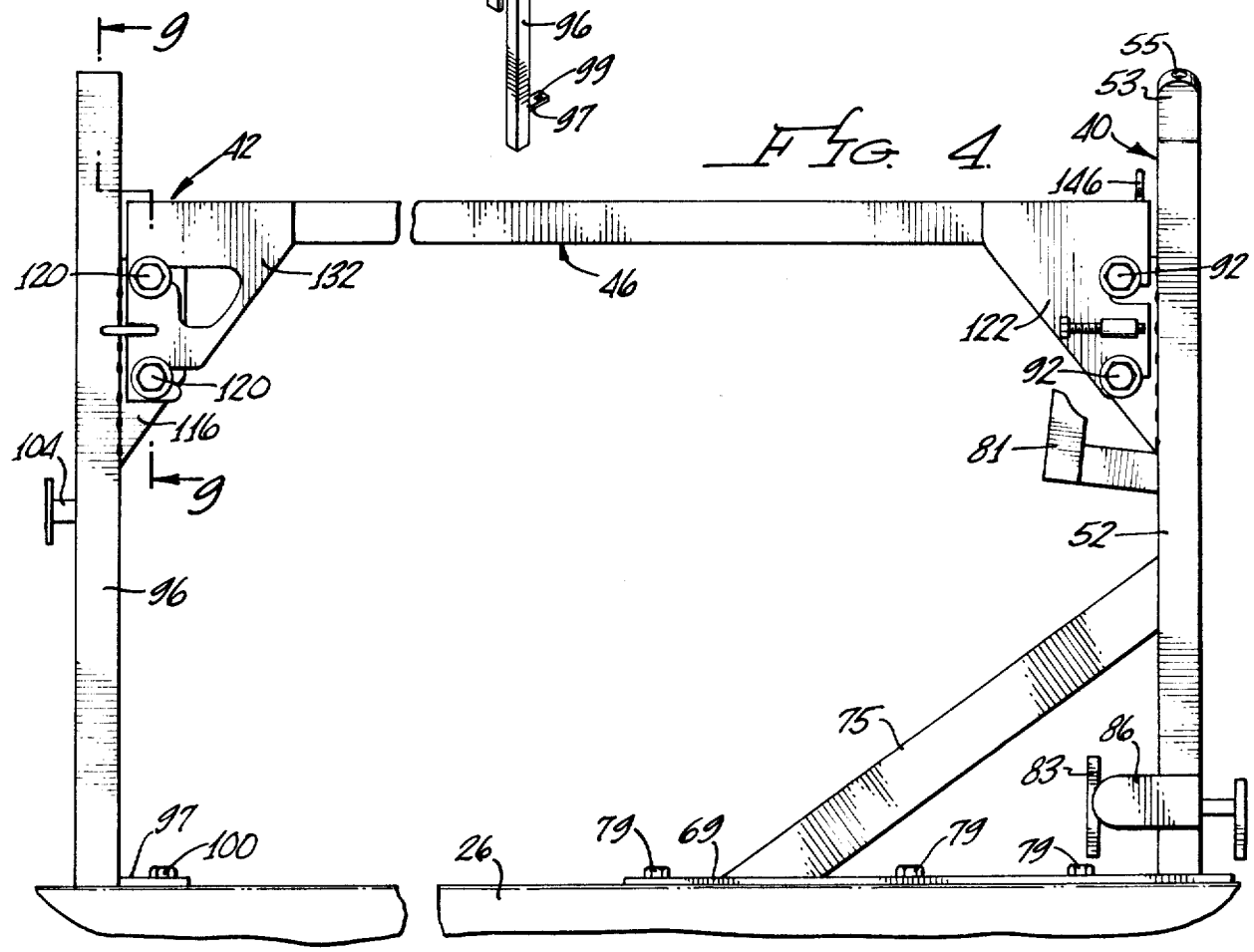

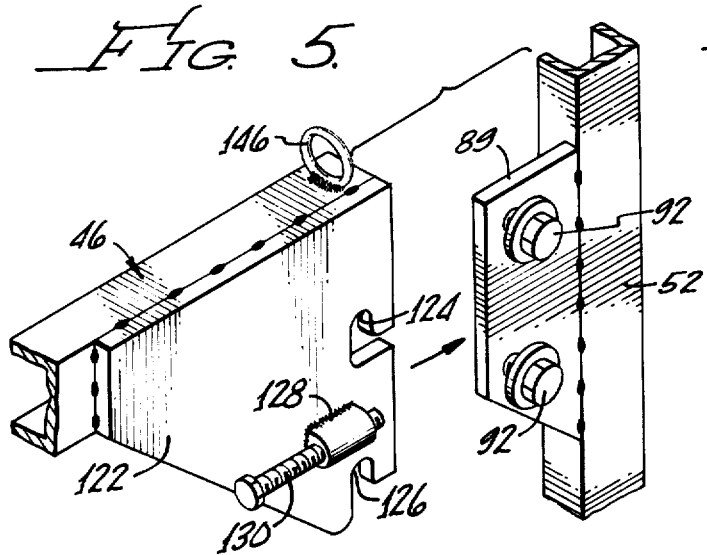
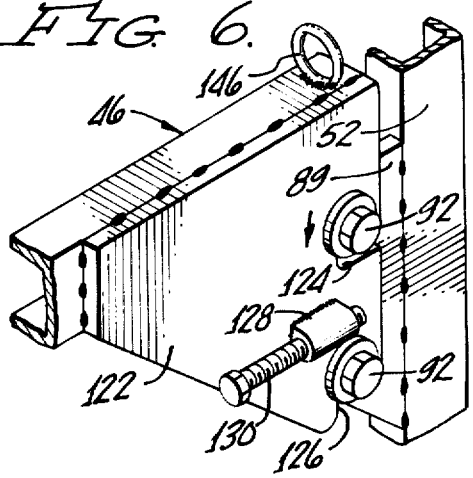
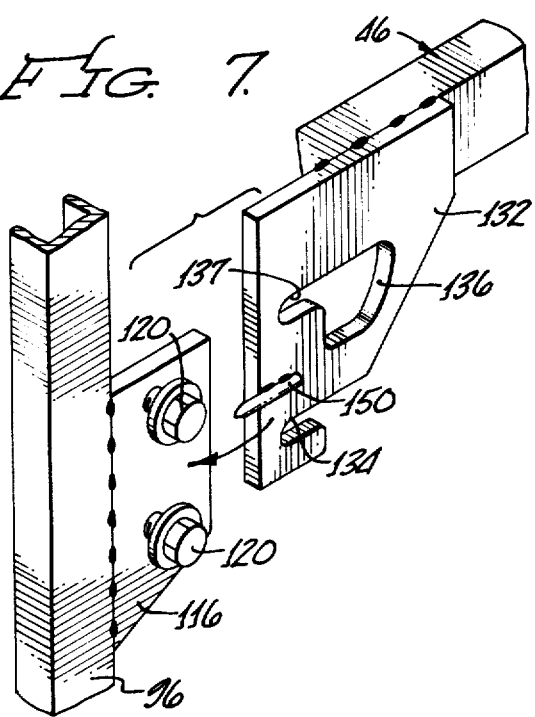
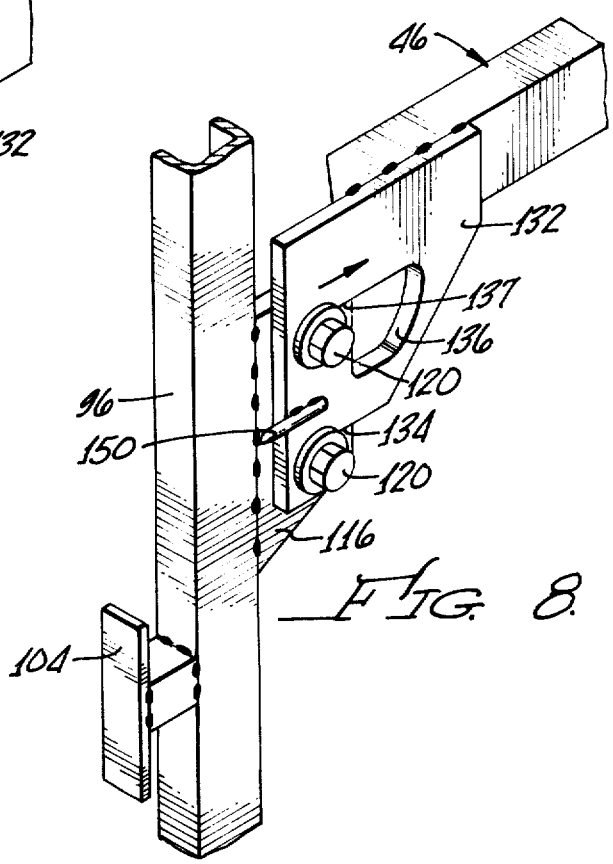

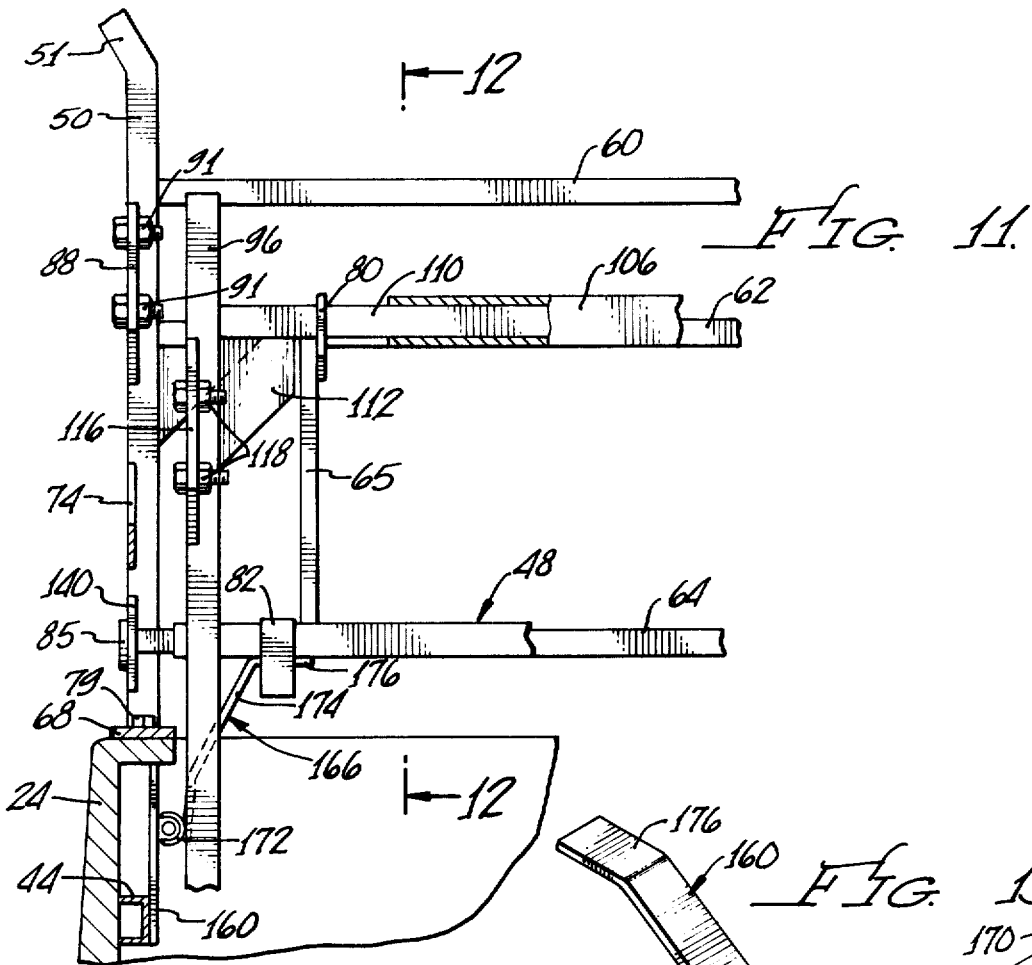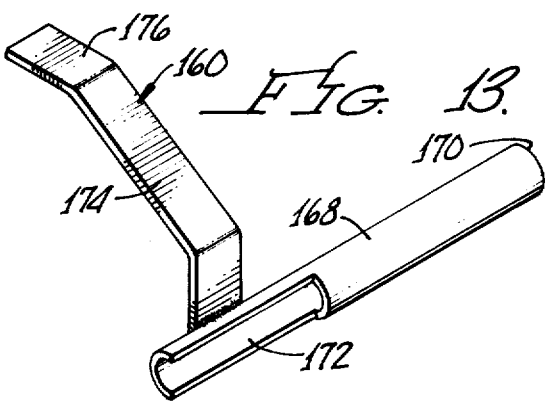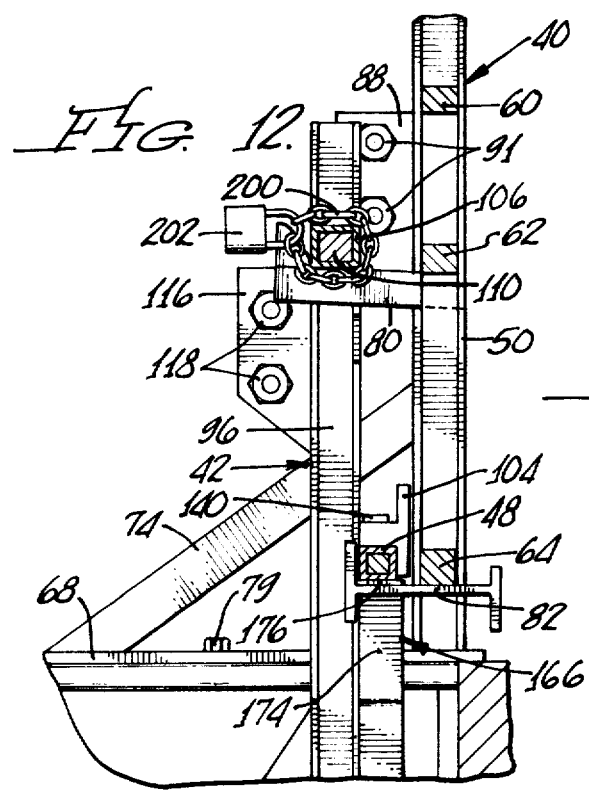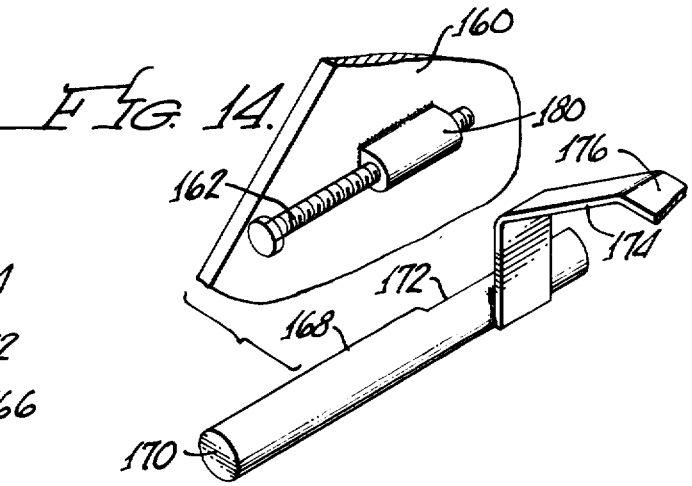

DEMOUNTABLE CARRIER RACK ASSEMBLY FOR PICKUP TRUCK

BACKGROUND OF THE INVENTION

The background of the invention will be discussed in two parts:

1. Field Of The Invention

This invention relates to carrier rack assemblies for pickup trucks, and more particularly to a demountable carrier rack assembly with storing capability.

2. Description Of The Prior Art

Pickup trucks are versatile vehicles for load hauling. Prior art devices have attempted to increase the versatility by providing covers or canopies such as shown and described in the following U.S. Patents: U.S. Pat. No. 2,129,893 issued Sept. 13, 1938 to Walden; U.S. Pat. No. 2,670,988 issued Mar. 3, 1954 to Cook; U.S. Pat. No. 2,824,764 issued Feb. 25, 1958 to Stirling; and U.S. Pat. No. 3,901,548 issued Aug. 26, 1979 to Seaman, Jr. Such prior art devices generally include a framework secured to the upstanding sides of the bed of the truck, with some of the devices being collapsible. However, none of these devices were intended for supporting a load on the framework.

A carrier rack intended for carrying a load thereon is shown and described in U.S. Pat. No. 3,765,713 issued Oct. 16, 1973 to Suitt. In accordance with the carrier rack of Suitt, a pair of longitudinally extending members are secured to the upper planer edges of the truck bed for supporting the framework independently of the stake holes provided in the sidewalls of the truck bed. However, with the construction employed by Suitt, although the framework of the rack may be disassembled, storage of the disassembled parts would present a problem thus decreasing the versatility of such a device.

Although not directed to a pickup truck, Garson, et al, in U.S. Pat. No. 3,155,419 issued Nov. 3, 1964, attempted to provide a convertible trailer with some self-storage capability. For that purpose, a flatbed trailer was employed with a plurality of door panels which may be secured to the bed for selective hinged use with the panels being constructed for storage on the flatbed against a fixed bulkhead.

It is an object of the present invention to provide a new and improved carrier rack assembly for a pickup truck.

It is another object of the present invention to provide a new and improved demountable carrier rack assembly which may be assembled or disassembled by one man and stored securely on the truck itself.

SUMMARY OF THE INVENTION

The foregoing and other objects of the invention are accomplished by providing a carrier rack assembly having a primary structural framework for securing to the front of the truck bed. A secondary framework is provided for securing to the rear of the truck bed, the secondary framework being of an inverted generally u-shaped configuration. First and second longitudinal running bars are provided for interconnecting the upper edges of the primary and secondary framework, with the running bars having channel-shaped openings for receiving therein an adjustable transversely extending load bar. The primary structural framework is provided with hook devices for storing the secondary framework thereon as well as the adjustable load bar. The running bars are each provided with an extending pin in one end thereof and an adjustable screw on the other end thereof, the pin being configured for being received within an aperture in the pickup sidewalls with the adjustable screw lockingly engaging a sleeve positionable on the primary framework. The dismantled components may then be secured together on the truck in a storage mode by suitable locking devices such as chains or the like.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a perspective view of a pickup truck having the carrier rack assembly mounted thereon in a storage position;

FIG. 2 is a perspective view of the truckbed portion of the pickup truck of FIG. 1 showing the carrier rack assembly according to the invention in its assembled position;

FIG. 3 is an exploded perspective view of the carrier rack assembly of FIG. 2;

FIG. 4 is a side elevational view, partially broken away, of the carrier rack assembly of FIG. 2;

FIG. 5 is an exploded perspective view of a portion of the carrier rack assembly illustrating the interconnection of the running bar to the primary framework;

FIG. 6 is a perspective view similar to FIG. 5 showing the parts in the assembled position;

FIG. 7 is an exploded perspective view of a portion of the carrier rack assembly illustrating the interconnection of the rear end of the running bar to the secondary framework;

FIG. 8 is a view similar to FIG. 7 illustrating the parts in the assembled position;

FIG. 11 is a rear elevational view, partially broken away, of the rack assembly in its storage position as shown in FIG. 10, as viewed generally along line 11—11 thereof;

FIG. 12 is a cross sectional view of the rack assembly in a storage position as viewed along line 12—12 of FIG. 11;

FIG. 13 is a perspective view of a locking sleeve device for use in storage; and FIG. 14 is an exploded perspective view of the locking sleeve device of FIG. 13 and a portion of one end of a running bar.

DESCRIPTION OF THE PREFERRED EMBODIMENT

Figure 9:
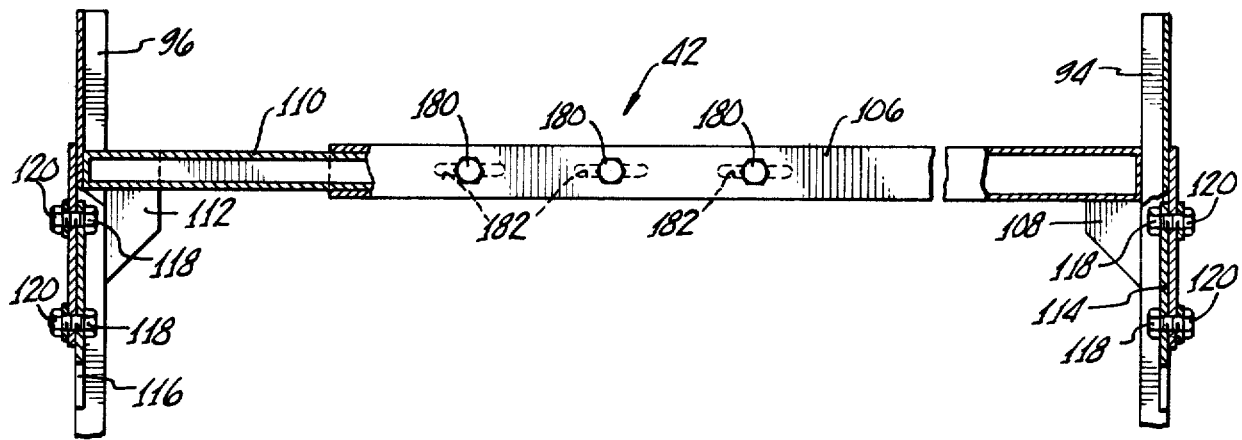
FIG. 9 is an elevational view, partially broken away, of the secondary framework of the carrier assembly of FIG. 4 as viewed generally along line 9—9 thereof.

Referring now to the drawings and particularly to FIG. 1 there is shown a pickup truck generally designated 20, the pickup truck being of conventional configuration and having a truckbed 22 with upwardly extending sidewalls 24 and 26, a front wall 28 and a tailgate 30. The sidewalls 24 and 26, in certain pickup trucks, have planar upper edges with stake holes 32-35 extending through the planer edges, the stake holes 32–35 inclusive having depending metal sleeves routed to the under surface of the edges and to the sidewalls 24 and 26.

Referring also to FIG. 2, the rack assembly according to the invention includes a primary structural framework generally designated 40 secured to the sidewalls 24 and 26 with the securing including use of the stake holes 34 and 35. A secondary framework generally designated 42 (configured like a goal post) is secured to the rear end of the truckbed 22 utilizing stake holes 32 and 33. For completing the rack assembly, longitudinally extending running bars 44 and 46 interconnect the upper edges of the primary and secondary frameworks 40 and 42 while a load bar 48 is positioned transversely between running bars 44 and 46. As can be seen in FIG. 2, there are only five structural assemblies used to form the demountable carrier rack assembly according to the invention. As will hereinafter be described, the primary structural framework 40 is permanently attached to the front end of the pickup truck bed 22, with only eleven bolts and three lock nuts required to be loosened, after which two bolts are then removed, after which the user is then in a position to then remove the secondary framework 42, the running bars 44 and 46, and the load bar 48. The primary structural framework 40 includes means for storing the secondary framework 42 and the adjustable load bar 48 while provision is made within the truck bed for storage of the running bars 44 and 46. Means are provided for securing the running bars 44 and 46 from removal when in the stored position. By the use of suitable locking means such as chains, clamps and locks, the carrier rack assembly may be readily demounted and stored on the truck itself secured from theft. FIG. 1 generally illustrates the carrier rack assembly in a stored position.

Referring now specifically to FIG. 2 through 4, each of the assemblies will be described in detail. The primary structural assembly 40 includes first and second generally parallel upwardly extending chassis posts 50 and 52 which are generally formed of channel iron with the upper edges 51 and 53 thereof canted or bent upwardly and outwardly. The upper edges of the canted portions 51 and 53 are provided with apertures 54 and 55 configured for receiving the hooked end of a helper chain 58, the purpose of which will be described later. Welded within the channels of chassis posts 50 and 52 are transversly extending beam members including a master beam 60, a main beam 62 and a bridge beam 64, the beam members being in generally parallel spaced relation to provide structural rigidity with a space between main beam 62 and bridge beam 64 being configured for alignment with the opening of the rear window of the cab of the pickup truck 20. Interconnecting the main beam 62 and bridge beam 64 are a pair of struts 65 and 66 which are of bar stock and suitably welded; the struts 65 and 66 being spaced to not obstruct the cab window.

For securing the primary framework 40 to the sidewalls 24 and 26 of the pickup truck bed 22, there are provided first and second generally bar-shaped secured plates 68 and 69, each having at one end thereof a generally rectangular aperture 70 and 71 respectively for fitting about the bottom edges of chassis posts 50 and 52 respectively and thence welded with the lower ends of chassis posts 50 and 52 depending therebelow for insertion into the stake holes 35 and 34 respectively of the truck bed 22. The secure plates 68 and 69 are secured in generally perpendicular relation with the chassis posts 50 and 52 and generally bar-shaped angle braces 74 and 75 are diagonally disposed between the upper surfaces of secure plate 68 and 69 and the vertical surfaces of chassis posts 50 and 52 with the angle braces 74 and 75 then being welded for providing vertical stability. The secure plate 68 is provided with a plurality of apertures 76 and the secure plate 69 is provided with a plurality of apertures 77 for passage therethrough of suitable fastening means such as bolts 79 which secure the primary framework 40 to the front end of the pickup truck bed 22.

Welded to the framework 40 to the upper edges of the struts 65 and 66 are a pair of saddle hooks 80 and 81 which may be conveniently formed of bar stock. Positioned immediately below the saddle hooks 80 and 81 and secured to the underside of bridge beam 64 are first and second generally identical stirrup means 82 and 83, each of the stirrup means 82 and 83 having a front stirrup portion extending towards the cab and a back stirrup portion extending toward the truck bed. The stirrup means 82 and 83 may be conveniently formed of rectangular tubular stock welded to the under surface of the bridge beam 64 with rectangular plates welded to the open ends thereof in upwardly and downwardly depending relation. Secured, such as by welding, to the outer surfaces of the chassis posts 50 and 52 adjacent the secure plates 68 and 69 are a pair of deadman members 85 and 86, the deadman plates 85 and 86 being generally tongue shaped bar stock having the tongues thereof extending rearwardly in generally parallel relation to the secure plates 68 and 69.

Welded to the chassis posts 50 and 52 in flush alignment with the outer surfaces thereof are a pair of spaced generally identical mating plates 88 and 89, each having a pair of apertures extending therethrough with nut members 91 welded to the inner surface thereof with bolt members 92 extending through the apertures for engaging the nut members 91. The mating plates 88 and 89 are secured at a position approximately flush with the bottom of the master beam 60.

The secondary framework 42 includes a pair of spaced, generally parallel chassis posts 94 and 96 which are conveniently formed of channel iron with the channel openings in facing relation. The chassis posts 94 and 96 are provided with generally perpendicularly aligned secure ears 95 and 97 positioned above the bottom edges of the chassis posts 94 and 96 a distance sufficient to enable these bottom edges to be inserted within the stake holes 32 and 33 at the rear of the pickup truck bed 22. Each of the secure ears 95 and 97 is provided with an aperture 98 and 99 for passage therethrough of suitable fastening means such as a bolt 100. Secured to the rear longitudinal edges of the chassis posts 94 and 96 are a pair of generally identically configured locking tongues 102 and 104, each of which are provided with a short rectangular tubular member perpendicularly aligned with the edge of the respective chassis posts 94 or 96 and a right angularly extending bar-shaped member welded to the open end thereof performing a generally T shaped locking tongue. Secured within the channel portion of the left chassis post 94 adjacent the upper end thereof is a generally perpendicularly extending rectangular tubular cross member 106 with a pair of bracket plates 108 positioned within the angle between cross member 106 and chassis post 94 for providing structural stability. Similarily, the right rear chassis post 96 is provided with a rectangular tubular cross member 110 having a cross sectional configuration for being received within the open end 107 of the left cross member 106 in telescopic relation. A suitable bracket plate 112 is then secured to the cross member 110 and to the chassis post 96 for maintaining the cross member 110 in perpendicular relation to the chassis post 96. The cross members 106 and 110 are at a distance from the secure ears 95 and 97 which is the same distance between the secure plates 68 and 69 and the master beam 60, the master beam 60 and the cross members 106 and 110 effectively being the upper elevation of the carrier rack assembly. Secure to each of the rear chassis posts 94 and 96, in flush relation with the outer edges thereof are a pair of rear mating plates 114 and 116, each of which is simiarily configured to the front mating plates 88 and 89 secure to the front chassis posts 50 and 52. The rear mating plates 114 and 116 are each provided with a pair of apertures extending therethrough having nut members 118 welded to the inner surface thereof for receiving bolt members 120 through the apertures. With the primary framework 40 and secondary framework 42 assembled on the truck bed 22 as illustrated in FIG. 2, each pair of mating plates, such as rear mating plate 116 and front mating plate 89 extend in a common plane toward each other with the adjacent surfaces of chassis posts 96 and 52 likewise being in the same plane.

The running bars 44 and 46 are mirror images of each other and include a main structural body portion formed of channel iron with the channel openings in facing relation, these main body portions having a length sufficient for being received between the front and rear chassis posts for securing thereto. For example, the right running bar 46 is provided at the front end thereof with a front leaf plate 122 having a generally L-shaped slotted opening 124 (see also FIGS. 5 and 6) and a second downwardly extended slotted opening 126, the leading edge of leaf plate 122 adjacent slot 126 being foreshortened. By reference specifically to FIGS. 5 and 6, the spacing between the horizontal portion of slot 124 and the foreshortened leading edge adjacent to slot 126 would be equal to or slightly less than the distance between centers of the fastening bolts 92. When the running bar 46 is moved toward the front mating plate 89 as indicated by the horizontally extending arrow in FIG. 5, the horizontally extending portion of slot 124 engages the shank of the upper bolt 92 with the leading edge adjacent slot 126 clearing the shank of the lower bolt 92. As the running bar 46 is pushed forwardly to its maximum extent, it is then permitted to drop as indicated by the arrow on leaf plate 122 in FIG. 6 and the bolts 92 are then tightened to secure the front end of running bar 46.

Relative to the outer surface of the leaf plate 122 is a threaded lug member 128, the threaded opening being generally parallel to the upper surface of running bar 46 with a threaded locking bolt 130 passing through the aperture thereof. The locking bolt 130 is not utilized in the assembled condition of the carrier rack assembly but, as will hereinafter be described, is utilized for storage of the running bar 46 within the truck bed 22.

Referring again to FIGS. 2 through 4, at the rearward end of running bar 46 there is a rear leaf plate 132 (see also FIGS. 7 and 8), the leaf plate 132 being roughly triangularly configured and secured to the right surface of the channel iron portion of running bar 46. The leaf plate 132 is provided with a generally horizontally extending slot 134 adjacent the lower edge thereof and an enlarged slotted opening 136 thereabove, the slotted opening 136 having a small slotted portion 137 in generally parallel relation with the slot 134, the distance between centers of slot 134 and 137 corresponding to the distance between centers of the bolts 120 secured to the rear mating plate 116. By reference to FIG. 7, for assembly, the leaf plate 132 is swung beyond the heads of bolts 120 and 122 until the head of the upper bolt 120 is in alignment with the enlarged slotted opening 136 whereupon the leaf plate 136 is swung inwardly (as indicated by the curved arrow) until the head of bolt 120 extends therethrough with the shank portion of the upper bolt 120 resting against the upper leading horizontal edge of the enlarged slotted opening 136. By reference to FIG. 8, the leaf plate 132 is then urged forwardly or to the right as indicated by the arrow thereon until the shanks of the two bolts 120 engage the upper and lower slotted portions 137 and 134, whereupon the bolts 120 may then be tightened.

Referring again to FIGS. 2 through 4, the load bar 48 is a generally rectangular tubular member having inserted into the ends thereof spring loaded rotatably keyed T bars 140 and 142, each of the T bars 140 and 142 having a shaft portion 141 and 143 respectively received within the interior of the rectangular tubular main body portion with the spring means therein. Secured to the outer edges of the shaft 141 and 143 are rectangular plate members 140a and 142a, the plate members being configured for being received within the channels of the opposing running bars 44 and 46, and slidably positionable therein. Although not shown in detail, each of the T-bars 140 and 142 may be urged inwardly against the force of the bias spring and rotated to a lock retracted position for storage. For storage purposes, both the load bar 48 and the secondary framework 42 may be shortened, the details of storage being discussed hereafter.

For assembly purposes, by reference specifically to. FIGS. 2 and 4, the main structural framework 40 has the depending ends of the chassis posts 50 and 52 inserted within the stake holes 35 and 34 until the secure plates 68 and 69 are resting on the upper planar edges of the sidewalls 24 and 26. The lower edges of chassis posts 50 and 52 fit within the metal sleeves normally provided as part of the stake holes 35 and 34. Suitable bolts 79 are then passed through the secure plates 68 and 69 and through apertures (not shown) drilled in the upper edges of sidewalls 24 and 26 of the pickup truck bed 22.

The secondary framework 42 is then adjusted laterally until the depending portions of the rear chassis post 94 and 96 are in alignment with the stake holes 32 and 33 with the posts 94 and 96 then being inserted therein until the secure ears 95 and 97 are in abutting relation with the upper planar edges of the sidewalls 24 and 26. Suitable fastening means such as bolts 100 are then passed through the secure ears 95 and 97 through apertures drilled in the sidewall edges to thereby fasten the secondary framework 42 to the rear end of the truck bed 22.

At this point, the running bars 44 and 46 may then be assembled to the primary and secondary frameworks 40 and 42 respectively. For this purpose, a pair of helper chains 58 (see FIG. 3) are utilized, the helper chains 58 each being a short length of chain with hooks affixed to each end. By reference to FIGS. 3–5, the front end of each running bar, such as running bar 46, is provided with a loop or eyelet 146 secured thereto for receiving one hook of the helper chain 58 with the other hook of the helper chain 58 then being passed through the aperture 55 in the upper end of chassis post 52. Once the front end of the running bar 46 is thus suspended, the operator may then lift the other end and by reference to FIGS. 7 and 8, suitably position the rear leaf plate 132 of the right running bar 46 over the bolts 120 of the mating plate 116 of the rear chassis post 96. Once the shanks of bolts 120 are positioned within the slots 134 and 137, and prior to tightening of the bolts 120, the operator may then go to the forward end of running bar 46. The operator then lifts the front end of running bar 46 (See FIGS. 5 & 6), horizontally slides the leaf plate 122 of running bar 46 horizontally or forwardly until the horizontal slotted portion of slot 124 passes over the shank of bolt 92, and then permits it to drop into engagement with slot 126 engaging the shank of lower bolt 92. The operator may then tighten the bolts 92 and 120 to secure the running bar 46 in its assembled position illustrated in FIGS. 2 and 4. The left running bar 44 may then be likewise assembled to left chassis post 50 and 94. With the running bars 44 and 46 secure, the operator then rotates the T-bars 140 and 142 one at a time to the extended position with the plates 140a and 142a then being slidably received within the inwardly extending facing channels of running bars 44 and 46. The spring bias of the T-bars 140 and 142 then maintain the load bar 48 in the assembled position illustrated in FIG. 2.

Referring now to FIGS. 9 through 14, the details and structure pertaining to the disassembly and storage of the carrier rack assembly will now be described. Initially, one running bar 44 or 46 and the load bar 48 is disassembled with the load bar 48 then being foreshortened by urging them in against the force of the spring and then rotating thru 90° until the key (not shown) passes out of alignment with the key slot (not shown), thereby locking the T-bars 140 and 142 against the force of the springs. The load bar 48 is then placed on the back stirrups 82 and 83 (see FIGS. 10 and 12). The running bars 44 and 46 are then ready for storage within the pickup truck bed 22 on the inside of the sidewalls 24 and 26. For this purpose, by reference to FIGS. 7 and 8, a locking pin 150 is welded to the outer surface of the leaf plate 132 in generally parallel alignment with the longitudinal center line of the channel member of running bar 46, the locking pin 150 extending beyond the edge of leaf plate 132. Similarly by reference to FIG. 10, the leaf plate 152 of the left running bar 44 is provided with an identical locking pin 154, and with the left running bar 44 in its inverted position, the locking pin 154 is inserted into an aperture 156 drilled in the supporting framework 158 on the inside of sidewall 24 of the pickup truck bed 22. As previously described, the left running bar 44 is the mirror image of the right running bar 46 and includes a front leaf plate 160 having a locking bolt 162 mounted thereon. The locking bolt 162 is then adjusted outwardly, that is toward the front wall 28 of the pickup truck bed 22 to urge against any convenient location such as a depending metal sleeve of the stake hole 35, thereby tightening and securing the left running bar 44 within the interior of the sidewall 24.

In order to secure the running bar 44 (as well as the running bar 46) against possible theft, an auxiliary device such as a locking member generally designated 166 is provided as illustrated in FIGS. 11 through 14. As shown in FIGS. 13 and 14, the locking device 166 includes a tubular locking sleeve 168 plugged or capped at one end 170 and having the longitudinal cut outs 172 at the other end thereof. Adjacent to cutout 172 and welded to the periphery of the locking sleeve 168 is a bent strap member 174 having a tab end 176 configured for being received within the back stirrup 82 below the load bar 48 (See FIGS. 11 and 12). By reference to FIGS. 13 and 14, the inside diameter of the locking sleeve 168 is slightly larger than the head of the locking bolt 162 and with the running bar 44 in position within the interior of the sidewall 24 as previously described, the following operation is performed. The operator takes the locking device 166 and positions the locking bolt 162 within the cutout portion 172 of locking sleeve 168. The locking sleeve 168 is then slid over the head of locking bolt 162 until the leading edge of cutaway portion 172 abuts against threaded lug 128. With load bar 48 removed or lifted, strap member 174 is slightly rotated until its tab end 176 rests on the horizontal surface of back stirrup 82 (FIGS. 11 and 12), with load bar 48 then positioned thereon. It is understood there is a second mirror-image locking device 156 for the other side for securing right running bar 46 in its stored position. Right and left running bars 44 and 46 thus stored, with load bar 48 in psoition on the back stirrups 82 and 83, secondary framework 42 is then ready for storage. For this purpose (see FIG. 9), telescoping cross members 106 and 110 may be secured with suitable bolt member 180 passing therethrough. Bolt members 180 may be removable or alternately, inner cross member 110 may be provided with elongate slots 182 so that bolts 180 may be simply loosened with the chassis post 94 and 96 urged toward each other with bolts 180 thereupon regithtened. Alternately (not shown) a nut may be welded to cross member 106 over slot 182 and a lock nut added to bolt 180, the combination providing means for securing cross members 106 and 110 by tightening bolt 180 onto cross member 110 through the welded nut and then securing bolt 180 with the lock nut.

Figure 10:
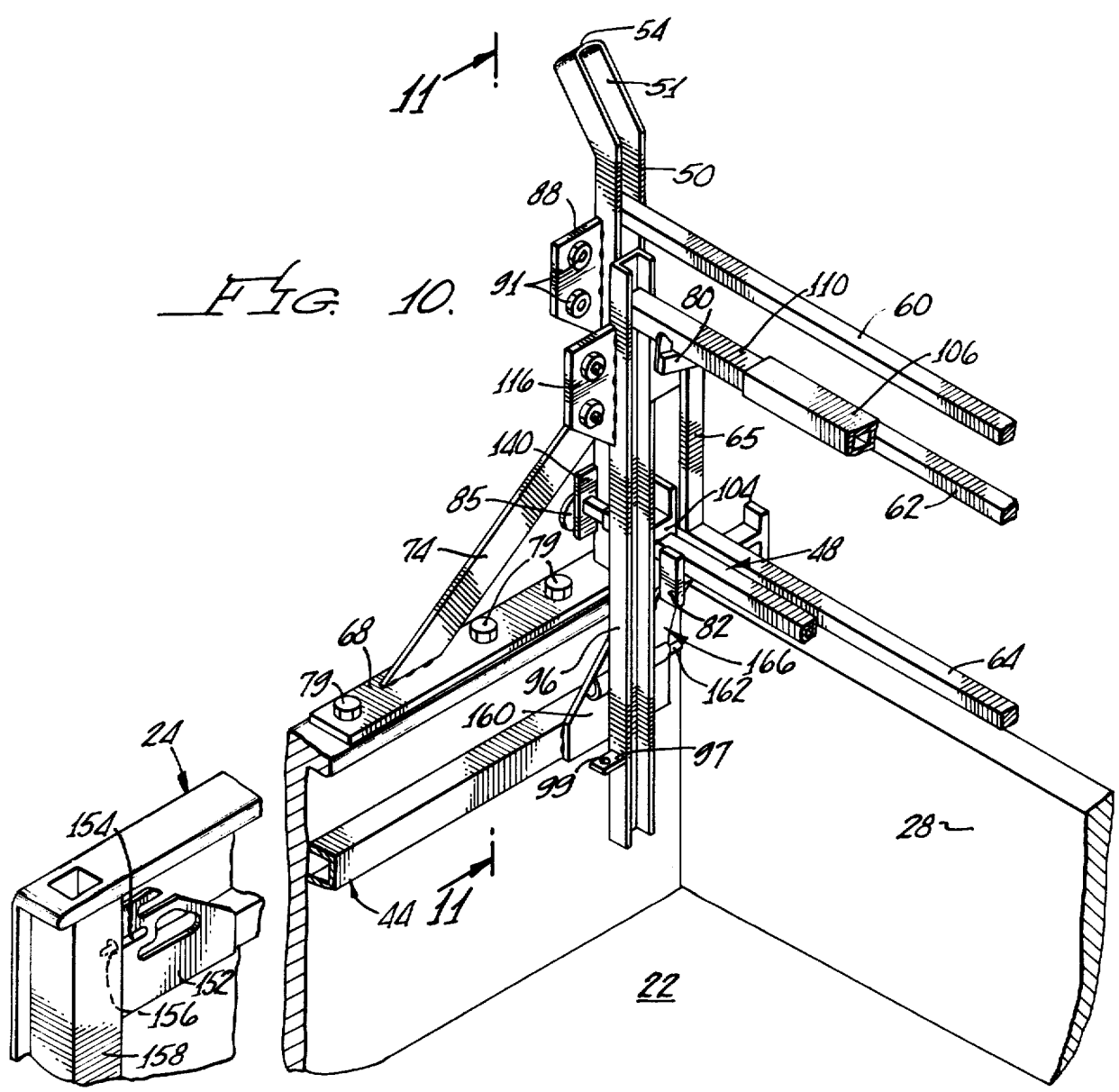
FIG. 10 is an enlarged perspective view of the carrier rack assembly and pickup truck bed, partially broken away, illustrating the rack assembly in its storage position.

Secondary framework 42 is then rotated 180° so that the previously front facing portion is now rear facing as depicted in FIG. 10. Secondary framework 42 is then positioned with cross members 110 and 106 immediately above the upper pair of saddle hooks 80 and 81, and then lowered until rear locking tongues 102 and 104 drop into encircling abutting engagement with the upper surface and forward facing edge of load bar 48. During this operation, upper cross members 110 and 106 drop into engagement with and are secured by saddle hooks 80 and 81 (see FIGS. 10-12). At this point, in sequence, locking device 166 is protecting the head of locking bolt 162 from access by tools with tab end 176 of locking device 166 resting within the front end of stirrup 82. In turn, load bar 48 rests on tab end 176 urging it into engagement with the horizontal edge of stirrup 82. Locking tongue 104 is in close abutting engagement with load bar 48 and, as shown in FIG. 12, the parts are matingly configured for capitvely retaining the various assembled stored parts. At this juncture cross member 110 is in resting abutting captive engagement with saddle hook 80. To secure the entire assembly, a chain 200 may be utilized to encircle cross member 110 and saddle hook 80 with a suitable locking means such as lock 202 then being passed through overlying links of chain 200 to securely fasten secondary framework 42 to primary framework 40. Alternatively, a pivotable hook or clamp may be affixed to saddle hook 80 with apertures in the open end of the hook for alignment with a suitable aperture in saddle hook 80 for passing of a lock therethrough. With the chain securely tightened as shown in FIG. 12, the various parts each in turn coact with the other parts for storage of the demountable assembly of the carrier rack to secure the same on the truck itself. Additionally, with the close mating relationship of the various parts, vibration is minimzed or eliminated. Additionally to preclude removal of load bar 48, or slidable movement, the outer ends of T-bars 140 and 142 are positioned in abutting engagement, in the storage position, with dead man plates 85 and 86 (FIGS. 10 and 11).

In accordance with the present invention, certain elements perform dual functions. For example, locking tongues 102 and 104 may be readily utilized as assists for tying ropes thereto for securing a load carried on the carrier rack assembly. Similarily, the saddle hooks 80 and 81 as well as the stirrups 82 and 83 may be readily utilized for that purpose. With the upper edges of the chassis posts 94 and 96 extending above the cross members 106 and 110, along with the upper edges of the front chassis posts 50 and 52 extending above the master beam 60, lateral support is provided for long bulky items carried on the rack assembly. Furthermore, by use of the helper chains 58 the carrier rack assembly may be readily assembled and disassembled by one man. Since the main removable and storable parts comprise assemblies of light weight with structural strength, one man operation is facilitated. The secondary framework 42 is essentially configured in an inverted u-shaped manner of channel iron, tubular stock, and bar stock. Each of the running bars 44 and 46 is basically a long piece of channel iron with leaf plates affixed to the ends thereof with the total weight of each running bar 44 and 46 being readily manipulated by one man. Simiarily, with the adjustable load bar 48 being formed of very few pieces, weight likewise is minimized. Simple mechanisms and devices are utilized for compact and efficient storage of the demountable portion on the truck itself without the necessity of removing the entire rack assembly and storing in a garage or the like.

While there has been shown and described a preferred embodiment, it is to be understood that various other adaptations and modifications may be made within the spirit and scope of the invention.

I claim:

1. In a carrier rack assembly for use in combination with the sidewalls of a pickup truck bed, the sidewalls having stake holes adjacent to corners thereof, the combination comprising:

a primary framework configured for securing to the sidewalls adjacent the front end of the pickup truck bed, the primary framework having first and second generally upright chassis post members configured for being received within the stake beds adjacent the front corners of the bed;

a secondary structural framework removably mountable to the sidewalls of the truck bed adjacent to the rear thereof, said secondary framework having first and second generally upright chassis post members configured for being received within the stake holes adjacent to the rear corners of the bed when assembled thereon, said chassis post members of said secondary framework being in general alignment with the chassis post members of said primary framework, said secondary framework is of an inverted generally U-shaped configuration having cross member means adjacent the upper ends of said secondary framework chassis post members, and said primary framework includes means for releasably receiving said secondary framework thereon when removed from the rear stake holes;

first and second generally elongate members, each having means at opposite ends thereof for removably affixing to the upper ends of aligned ones of said chassis post members of each sidewall, each of said generally elongate members being a mirror image of the other, and the means at opposite ends of an elongate member include means configured for coaction with the interior of a sidewall for storage of the elongate member within the truck bed; and adjustable load bar means transversely extending between said elongate members.

2. The combination according to claim 1 wherein the coacting means at one end of an elongate member is a locking pin insertable within an aperture formed in the sidewall, and the coacting means at the other end of the elongate member inlcudes a locking bolt rotatably to urge against a structural portion of the pickup truck bed.

3. The combination according to claim 2 further including a locking device having a locking sleeve for surrounding said locking bolt and a strap members, said primary framework includes stirrup means for receiving one end of the strap member therein, and said secondary framework cross member means comprises cross members in telescoping relation adjacent the upper ends of said secondary framework chassis post members.

4. In a carrier rack assembly for use in combination with the sidewalls of a pickup truck bed, the sidewalls having stake holes adjacent to corners thereof, the combination comprising:

a primary framework configured for securing to the sidewalls adjacent the front end of the pickup truck bed, the primary framework having first and second generally upright chassis post members configured for being received within the stake holes adjacent the front corners of the bed;

a secondary structural framework removably mountable to the sidewalls of the truck bed adjacent to the rear thereof, said secondary framework having first and second generally upright chassis post members configured for being received within the stake holes adjacent to the rear corners of the bed when assembled thereon, said chassis post members of said secondary framework being in general alignment with the chassis post members of said primary framework and, said secondary framework having cross member means adjacent the upper ends of said secondary framwork chassis post members;

first and second generally elongate members, each having means at opposite ends thereof for removably affixing to the upper ends of aligned ones of said chassis post members of each sidewall;

adjustable load bar means transversly extending between said elongate members;

each of said elongate member include a channel portion with both channel portions being in facing relation with said load bar means slidably receivable within said facing channel portions, and said secondary framework cross member means comprises cross members in telescoping relation adjacent the upper ends of said secondary framework chassis post members;

said load bar means includes a generally elongate tubular body portion and first and second T-bar means in the open ends thereof;

said primary framework includes means for releasably receiving said secondary framework thereon when removed from the rear stake holes; and said primary framework further includes stirrup means for releasably retaining said load bar means with said load bar means removed from said carrier rack assembly and said T-bar means are spring biased outwardly.

5. In a carrier rack assembly for use in combination with the sidewalls of a pickup truck bed, the sidewalls having stake holes adjacent to corners thereof, the combination comprising;

a primary framework configured for securing to the sidewalls adjacent the front end of the pickup truck bed, the primary framework having first and second generally upright chassis post members configured for being received within the stake holes adjacent the front corners of the bed;

a secondary structural framework removably mountable to the sidewalls of the truck bed adjacent to the rear thereof, said secondary framework having first and second generally upright chassis post configured for being received within the stake holes adjacent to the rear corners of the bed when assembled thereon, said chassis post members of said secondary framework being in general alignment with the chassis post members of said primary framework and, said secondary framework having cross member means adjacent to the upper ends of said secondary framework chassis post members;

first and second generally elongate members, each having means at opposite ends thereof for removably affixing to the upper ends of aligned ones of said chassis post members of each sidewall, each of said generally elongate members include an elongate channel iron member and the means at opposite ends thereof include slotted leaf plates for matingly coacting with bolt members on first and second mating plates secured to one chassis post on the secondary framework and to an aligned chassis post on the primary framework, and said primary framework includes hook means configured for releasably retaining said secondary framework thereon when said secondary framework is removed from the rear stake holes; and adjustable load bar means transversly extending between said elongate members.

6. The combination according to claim 5 wherein said load bar means is slidably receivable within facing channel portions of opposing elongate members, and said secondary cross member means comprises cross members in telescoping relation adjacent the upper ends of said secondary framework chassis post members.

7. In a carrier rack assembly for use in combination with a pickup truck bed sidewalls having stake holes in opposite corners thereof, the combination comprising:

a primary framework having first and second generally upright chassis post members for being received within the stake holes adjacent the front corners of the bed;

a secondary framework having first and second generally upright chassis post members, the lower ends thereof being configured for being received within the stake holes adjacent the rear corners of the beds, said secondary framework having cross members in telescoping relation adjacent the upper ends of said secondary framework chassis post members; and hook means on said primary framework configured for releasably retaining the secondary framework thereon when removed from the rear stake holes.

8. The combination according to claim 7 further including first and second running bar members, said running bar members being generally identical mirror image configurations, each of said running bar members having a main channel-shaped body portion with first and second slotted leaf plates secured to opposite ends thereof, one of said slotted leaf plates being configured for engaging bolt members threadably secured to a mating plate affixed adjacent the upper end of a chassis post of the secondary framework, and the other slotted leaf plate being configured for matingly engaging both members threadably secured to a second mating plate affixed adjacent the upper end of a chassis post of the primary framework, each of said running bars extending generally parallel and in alignment with a sidewall of the pickup truck bed.

9. The combination according to claim 8 further including load bar means having spring-loaded T-bar means on opposite ends thereof configured for mating sliding engagement within the channel openings of said running bar members.

10. The combination according to claim 9 wherein each running bar member includes a locking pin affixed to a first leaf plate member and an adjustable locking bolt affixed to the other leaf plate member, said running bar member being configured for being received on the interior of a sidewall with the locking pin engaging an aperture in a structural portion of the rear part of the pickup truck bed and said locking bolt being adjustable to urge against another structural portion adjacent the front of the pickup truck bed for securing the running bar member on the interior of a sidewall.

11. The combination according to claim 10 wherein said primary framework includes stirrup means and said rack assembly further includes a locking device having a locking sleeve for receiving the head of said locking bolt therein and a strap member secured to the locking sleeve and having the free end thereof configured for resting within the stirrup means of said primary framework.

12. The combination according to claim 11 wherein said stirrup means are configured for receiving thereon said load bar means when disassembled with the load bar means resting on the free ends of the locking devices.

13. The combination according to claim 11 wherein said hook means is in general alignment with said stirrup means and upwardly therefrom.

14. The combination according to claim 13 wherein said secondary framework further includes first and second locking tongue means on said chassis post members, said locking tongue means being configured for matingly engaging said load bar means with said load bar means resting on said stirrup means and the cross member of said secondary framework received within said hook means.

15. The combination according to claim 13 further including means for securing said secondary framework to said primary framework with said secondary framework resting thereon whereby to secure the components in the stored position.

16. The combination according to claim 15 wherein said means for securing includes at least one chain member and a lock.

* * * * *